US012780668B2

(12) United States Patent
Tran et al.

(10) Patent No.: US 12,780,668 B2

(45) **Date of Patent: *Nov. 3, 2026**

(54) METHOD AND APPARATUS FOR SEPARATING A FLOW RICH IN CARBON DIOXIDE BY DISTILLATION TO PRODUCE LIQUID CARBON DIOXIDE

(71) Applicant: L'Air Liquide, Societe Anonyme pour l'Etude et l'Exploitation des Procedes Georges Claude, Paris (FR)

(72) Inventors: Michael Tran, Champigny sur Marne (FR); Mathieu Leclerc, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 579 days.

This patent is subject to a terminal disclaimer.

(21) Appl. No.: 18/274,578

(22) PCT Filed: Jan. 27, 2022

(86) PCT No.: PCT/EP2022/051845

§ 371 (c)(1),
(2) Date: Jul. 27, 2023

(87) PCT Pub. No.: WO2022/162041

PCT Pub. Date: Aug. 4, 2022

(65) Prior Publication Data

US 2024/0101430 A1 Mar. 28, 2024

(30) Foreign Application Priority Data

Jan. 27, 2021 (FR) ...................................... 2100737

(51) Int. Cl.

*C01B 32/00* (2017.01)
*B01D 3/16* (2006.01)

(Continued)

(52) U.S. Cl.

CPC .............. *C01B 32/50* (2017.08); *B01D 3/166* (2013.01); *B01D 3/32* (2013.01)

(58) Field of Classification Search

None

See application file for complete search history.

(56) References Cited

U.S. PATENT DOCUMENTS

2007/0232706 A1 10/2007 Shah et al.
2008/0196584 A1 8/2008 Ha (Continued)

FOREIGN PATENT DOCUMENTS

CN 106 979 664 9/2019
WO WO-2013171426 A2 * 11/2013 ............. F25J 3/0252

OTHER PUBLICATIONS

WO-2013171426-A2, English translation (Year: 2013).*
International Search Report and Written Report for PCT/EP2022/051845, mailed Apr. 20, 2022.

*Primary Examiner* — Stefanie J Cohen

(74) *Attorney, Agent, or Firm* — Justin K. Murray

(57) ABSTRACT

An apparatus for the separation of a flow containing carbon dioxide by distillation comprising a heat exchange means, a distillation column, means for sending the flow to be cooled in the heat exchange means down to a first intermediate temperature in order to form a liquid flow at a first temperature and at a first pressure, means for dividing the liquid flow in order to form a first fraction and a second fraction, means for expanding the first fraction to the pressure of a distillation column, means for sending the expanded first fraction to an intermediate level of the distillation column, means for exiting the second fraction from the cold end of (Continued)

the heat exchange means after cooling, means for expanding the cooled second fraction to the pressure of the distillation column, means for sending the second fraction to the distillation column and means for the withdrawal, from the bottom of the column, of a liquid flow.

9 Claims, 1 Drawing Sheet

(51) Int. Cl.

*B01D 3/32* (2006.01)

*C01B 32/50* (2017.01)

(56) References Cited

U.S. PATENT DOCUMENTS

| | | | | |
|---|---|---|---|---|
| 2012/0067082 | A1 | 3/2012 | Tranier | |
| 2014/0123700 | A1 | 5/2014 | Stallmann | |
| 2016/0327333 | A1* | 11/2016 | Chambron | F25J 1/0292 |
| 2020/0318897 | A1 | 10/2020 | Xu | |

* cited by examiner

[Fig. 1]
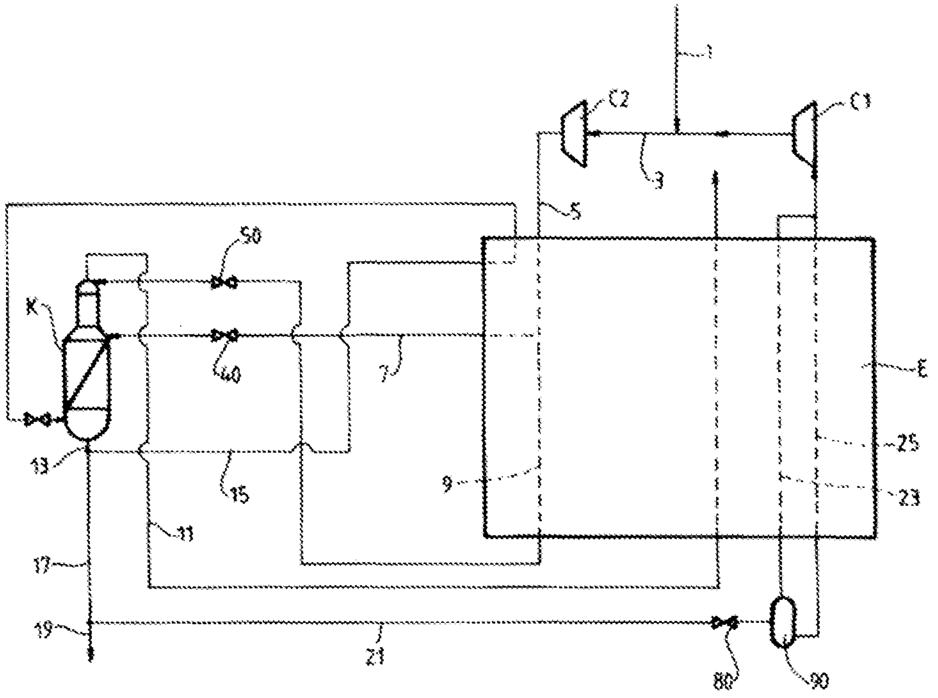
[Fig. 2]
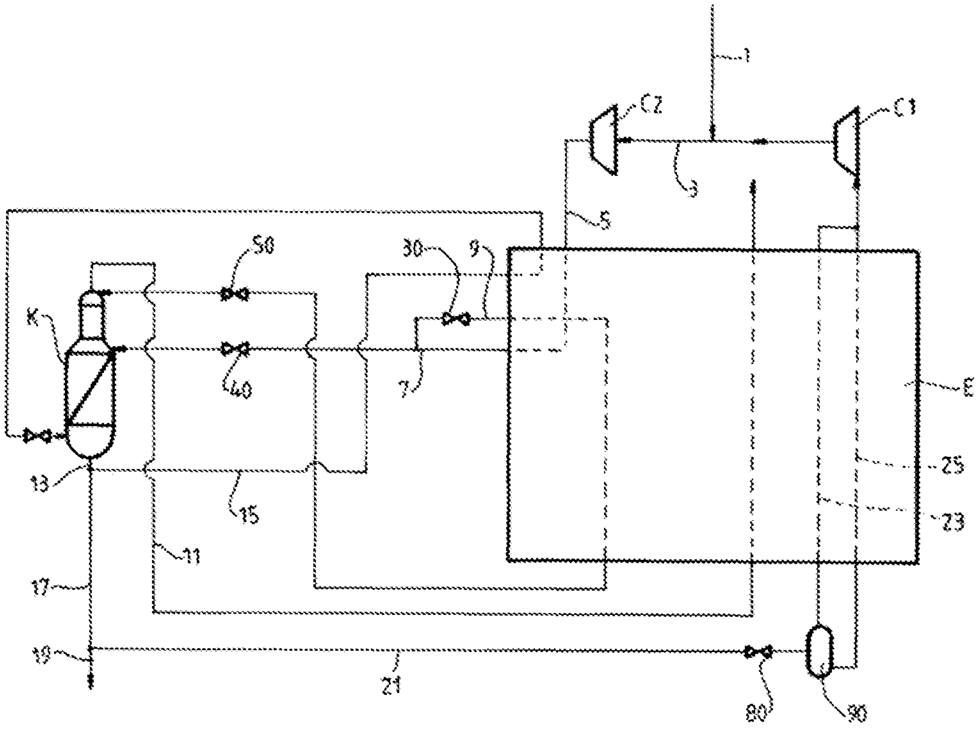

METHOD AND APPARATUS FOR SEPARATING A FLOW RICH IN CARBON DIOXIDE BY DISTILLATION TO PRODUCE LIQUID CARBON DIOXIDE

CROSS REFERENCE TO RELATED APPLICATIONS

This application is a § 371 of International PCT Application PCT/EP2022/051845, filed Jan. 27, 2022, which claims the benefit of FR2100737, filed Jan. 27, 2021, both of which are herein incorporated by reference in their entireties.

FIELD OF THE INVENTION

The present invention relates to a process and to an apparatus for the separation of a flow rich in carbon dioxide by distillation in order to produce gaseous and/or liquid carbon dioxide.

BACKGROUND OF THE INVENTION

In the processes usually described for the compression and purification of a flow rich in carbon dioxide including a distillation column, the fluid from the column top is partially condensed and then directed to a phase separator. The liquid is either introduced as reflux into the column by gravity, in the case where the condenser is placed above the column, or is injected using a pump in the opposite case. In some cases, all or part of the stream from the column top is recycled and then compressed upstream of the column in order to be subsequently purified of its light compounds. In these inventions, there is never any question of using the subcooled feed stream in a multistream exchanger to form the reflux of the column in order to improve its efficiency.

"Start-up of Port-Jérôme CRYOCAP™ plant" by Pichot et al., Energy Procedia, shows a process for the separation of carbon dioxide and oxygen where the feed flow is used to reboil the bottom of the column. The feed flow is thus entirely condensed and sent to the head of the column.

SUMMARY OF THE INVENTION

In a process according to an embodiment of the invention for the liquefaction and separation of $CO_2$ rich in $CO_2$ (>95 mol %), intended for example for food use, predominantly composed for the remainder of impurities ($O_2$, $N_2$, CO, for example), the $CO_2$ under pressure is liquefied and subsequently separated into two streams directed, for one, toward a separation column, the aim of which is to obtain a liquid product at the column bottom concentrated in $CO_2$ (>99 mol %, indeed even >99.8 mol %). The first part of the main stream is sent to an intermediate level of the column. The second part of the main stream, subcooled in the main exchanger, serves as reflux for this same separation column in order to benefit from the coldest possible reflux in order to limit losses at the column top and thus to increase the overall yield of the process. These two streams will thus be the feed, possibly main feed, and the reflux of the column.

In certain embodiments, the present invention relates to a process for the liquefaction and separation of $CO_2$, for example feed $CO_2$, rich in $CO_2$. The use of a separation column is necessary when the final product must be concentrated in $CO_2$ (>99 mol %). The objective of the present invention is to minimize the loss of $CO_2$ at the column top by addition of a reflux integrated in the main exchanger of the liquefier in order to reduce the total number of items of equipment.

In a process according to certain embodiments of the invention, a feed flow containing at least 95 mol % of carbon dioxide also contains at least one other impurity, such as oxygen, nitrogen, argon or carbon monoxide.

In certain embodiments, the invention provides for the use of a part of the flow of the feed, which is liquefied at a higher pressure than the column, as reflux of the distillation column. This stream is subcooled in a heat exchange means down to a minimum temperature close to the triple point of $CO_2$, then expanded to the pressure of the column.

The advantage of this scheme is that:

On the one hand, the contribution of this level of cold originating from the reflux stream will make it possible to increase the yield of the process, while maintaining good separation of the impurities dictated by the reboiling flow. The partial flow of $CO_2$ thus being less in the gas withdrawn at the column top, the column bottom stream representing the product is thus more enriched in $CO_2$, which brings about a better yield of the overall process. The contribution of cold at this temperature, which is the lowest of the process, is limited solely to the reflux.

On the other hand, this energy integration avoids the installation of a column top condenser, a separator for the partially condensed overhead gas and a pump. This configuration thus exhibits the benefit of having fewer installation constraints related to the hydraulics of the system. In addition, the reflux thus withdrawn from the feed stream has not yet been enriched in light products, which will thus make it possible to limit the demand for reboiling to thus improve the energy efficiency of the process.

In an alternative embodiment, the invention provides for the expansion, a first time, of the feed stream at the main exchanger outlet with a first valve and then with a second valve after subcooling in the main exchanger. This system makes it possible to minimize the temperature of the reflux resulting from the expansion. This is because the expansions of carbon dioxide can be accompanied by a rise in temperature under the conditions of the liquefier. Reducing the final pressure drop (while considering a temperature of −52° C. before expansion) makes it possible to minimize this rise and thus to obtain the coldest possible reflux, this with the aim of limiting the losses of $CO_2$ at the column top. US2008/0196584 describes a process for the separation of a flow containing at least 95 mol % of carbon dioxide which does not produce a liquid as the final product. The flow to be separated is separated upstream of a heat exchanger, one of the flows being partially condensed in a bottom reboiler of a distillation column where the flow separates.

According to an embodiment of the invention, there is provided a process for the separation of a flow containing at least 95 mol % of carbon dioxide and also at least one impurity lighter than carbon dioxide by distillation, in which:

i. the flow is cooled in a heat exchange means down to a first intermediate temperature of the heat exchange means, greater than that of the cold end and lower than that of the hot end of the heat exchange means, to form a liquid flow cooled to the first intermediate temperature and at a first pressure, and the cooled liquid flow is divided into at least two in order to form a first liquid fraction and a second liquid fraction, ii. the first fraction in liquid form is expanded to the pressure of a distillation column (K), called second pressure, which is lower than the first pressure, and it is sent to an intermediate level of the distillation column, iii. the second fraction is subcooled in the heat exchange means down to the cold end of the latter, it is expanded in liquid form to the pressure of the distillation column and it is sent to a level of the distillation column above the point of arrival of the first fraction, and iv. a liquid flow containing at least 99 mol % of carbon dioxide is withdrawn at the bottom of the column as liquid product.

According to other optional aspects:

at least a part of the liquid product is sent to be vaporized in the heat exchange means and an overhead gas from the distillation column is heated in the heat exchange means, all the overhead gas from the distillation column is withdrawn from the column and heated in the heat exchange means, the flow is divided in order to form the first and second fractions outside the heat exchange means and the second fraction is expanded in a valve to a third intermediate pressure between the first pressure and that of the distillation column before being sent back to the heat exchange means in order to cool it, the second fraction is returned to the heat exchange means at a second temperature greater than the first temperature, the flow is divided in order to form the first and second fractions in the heat exchange means, at least a part of the bottom liquid from the column is heated in the heat exchange means against the flow to be separated and is returned in gaseous form to the bottom of the column, the part of the bottom liquid is sent to the heat exchange means at a third temperature greater than the first intermediate temperature, and optionally than the second temperature, the column comprises two sections, a first section between the arrivals of the first and second fractions and a second section below the arrival of the first fraction, the first section having a diameter less than or equal to that of the second section, the ratio between the flows of the first and second fractions can be varied according to the carbon dioxide purity of the flow to be separated, the first pressure is greater than that of the column by at least 1 bar, indeed even by at least 10 bars, preferably by at least 20 bars, or by at least 30 bars, and/or a part of the bottom liquid from the column is vaporized at a pressure lower than the first pressure.

According to another subject matter of the invention, there is provided an apparatus for the separation of a flow containing at least 95 mol % of carbon dioxide and also at least one impurity lighter than carbon dioxide by distillation comprising a heat exchange means, a distillation column, means for sending the flow to be cooled in the heat exchange means down to a first intermediate temperature greater than that of the cold end and lower than that of the hot end of the heat exchange means in order to form a liquid flow at the first intermediate temperature and at a first pressure, means for dividing the liquid flow into at least two in order to form a first liquid fraction and a second liquid fraction, means for expanding the first liquid fraction to the pressure of the distillation column, called second pressure, which is lower than the first pressure, means for sending the expanded first fraction to an intermediate level of the distillation column, means for exiting the second liquid fraction from the cold end of the heat exchange means after subcooling, means (50) for expanding the subcooled second fraction to the pressure of the distillation column, means for sending the expanded second fraction from the distillation column at a level above the intermediate level and means for the withdrawal, from the bottom of the column, of a liquid flow containing at least 99 mol % of carbon dioxide as liquid product.

According to other optional aspects, there is provided:

the heat exchange means is a plate and fin heat exchanger, the apparatus comprises means for sending a part of the bottom liquid from the column to the exchange means in order to be heated by heat exchange with the flow to be separated, the apparatus comprises means for sending a part only of the bottom liquid from the column to the exchange means in order to be heated by heat exchange with the flow to be separated, the apparatus does not comprise any expansion turbine, the apparatus does not comprise a bottom reboiler heated by the flow to be separated or a part of the flow to be separated, the apparatus does not comprise any phase separation means connected upstream of the column, means for sending at least a part of the liquid product to be vaporized in the heat exchange means, and/or means for sending an overhead gas from the distillation column to be heated in the heat exchange means.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 illustrates a process in accordance with an embodiment of the present invention.

FIG. 2 illustrates a process in accordance with an embodiment of the present invention.

DETAILED DESCRIPTION OF THE INVENTION

In FIG. 1, the flow 1 containing at least 95 mol % of carbon dioxide also contains at least one other impurity, such as oxygen, nitrogen, argon or carbon monoxide. The flow 1 at a first pressure can be compressed in a compressor C2 to a first pressure greater than that of the column K in order to form a compressed flow 5 at the first pressure.

The first pressure can be greater by at least 1 bar than that of the column K, preferably by at least 10 bars, indeed even by at least 20, 30 or 40 bars, than that of the column K. For example, the first pressure can be at least 50 bars.

The compressed flow 5 is cooled in the heat exchange means E having indirect exchange in order to form a cooled and liquefied flow 2 at the first pressure. The cooled and liquefied flow can be divided into two parts 7 and 9 in the heat exchange means. The part 7 exits from the heat exchange means E at an intermediate temperature T1 of the latter without having been expanded upstream of the dividing point.

It will be understood that the heat exchange means E can be composed of a single heat exchanger, as illustrated in the figure. It can also be composed of a plurality of heat exchangers. In this case, the flow 7 would not be withdrawn at an intermediate level of a single heat exchanger but at the cold end of one of the heat exchangers, which form the heat exchange means.

The two fractions 7 and 9 can be at the first pressure greater than that of the column by at least 1 bar, indeed even by at least 10 bars, preferably by at least 20 bars, or by at least 30 bars. Preferably, the heat exchanger E is a plate and fin exchanger.

The second fraction 9 continues its cooling up to the cold end of the heat exchanger E in order to subcool it in the main heat exchange means down to a minimum temperature close to the triple point of $CO_2$. Subsequently, it is expanded to the pressure of the column K in the valve 50 and sent as liquid flow to the top of a distillation column K above the point of arrival of the first fraction 7. The column is a single column, not having an overhead condenser. It contains structured plates or packings and operates at a second pressure lower than the first pressure. It comprises a first section having a first diameter and a second section, above the first section, having a smaller diameter than the first diameter.

The first fraction 7 is sent to the column K at an intermediate level of the column, for example between the first and the second sections, after expansion from the first pressure to the pressure of the column K in the valve 50.

The bottom liquid 13 from the column K contains at least 99 mol % of carbon dioxide and is divided into three parts. A part 19 serves as liquid product rich in carbon dioxide. A part 21 is expanded in the valve 80 to form a two-phase flow separated in a phase separator 90. The gaseous part 23 is heated in the exchanger and is sent to the compressor C1. The liquid part 25 is vaporized and heated in the heat exchange means E from the cold end up to the hot end. It can be divided into several parts which are expanded to different pressures, introduced at the cold end of the heat exchange means E and vaporized at different pressures, in order to optimize the heat exchange. Downstream of the hot end, the gas formed is compressed in a compressor C1 and joins the gas 1 to form the gas 3. The vaporization pressure(s) is/are lower than the first pressure, which is that of the flow 5.

It will be understood that the compressors C1 and C2 can be stages of the same compressor.

According to the pressure at which the flow 21 is vaporized, the compressor C1 can be eliminated and the gas formed by vaporizing the flow 21 can be sent to the inlet of the compressor C2.

The vaporization pressure of the flow 21 can be greater than, equal to or lower than the pressure of the flow 1 to be treated. Thus, for example, the flow 1 can be compressed in at least a first compressor (or compressor stage) to be joined by the vaporized flow 21 at higher pressure. Optionally, the two mixed flows can be compressed together to form the flow 2.

A part 15 of the bottom liquid is heated from a third temperature T3>T2>T1 at the hot end of the heat exchange means E and is expanded in a valve and returned to the bottom in gaseous form to supply the column K.

The fluids 7, 9 and 15 introduced into the column take part in the distillation and are separated to form a product rich in carbon dioxide 19.

A part of the bottom liquid and/or of the vaporized liquid can serve as product of the process containing at least 99%, indeed even at least 99.8%, of carbon dioxide.

The overhead gas 11 from the column contains at least one impurity lighter than carbon dioxide, such as oxygen, nitrogen and argon. It is heated in the heat exchange means E in the example but it is not necessarily heated.

Likewise, no liquid originating from the distillation is necessarily heated in the heat exchange means.

The cold for cooling the gas to be separated can be provided by a refrigeration cycle and/or a contribution of cold from an external source, for example an arrival of low-temperature liquid.

The absence of a column K overhead condenser, the absence of a separator for the overhead gas and the fact that the scheme does not comprise a pump, apart possibly from a product pump, are noted.

The column K can operate at least 10 bars, preferably between 10 and 16 bars.

In an alternative form, illustrated in FIG. 2, the fractions of the feed gas 5 can be separated after having exited the flow 5 at an intermediate temperature from the exchanger E. The first fraction 7, as before, is expanded in the valve 40 and sent to an intermediate level of the column K. The second fraction 9 is expanded a first time at the outlet of the main exchanger E with a valve 30 to an intermediate pressure (for example from 55 bars to 31 bars, if the first pressure is 55 bars). Subsequently, it is returned to the heat exchange means at a higher temperature, since the expansion in the valve 30 has increased the temperature of the flow. The second fraction 9 is cooled up to the cold end of the heat exchange means and then is expanded a second time with a valve 50 after subcooling in the main exchanger E, for example from 31 bars to the pressure of the column K (for example between 10 and 16 bars). This system makes it possible to minimize the temperature of the reflux resulting from the expansion. This is because the expansions can be accompanied by a rise in temperature under the conditions of the liquefier. Reducing the final pressure drop (while considering a temperature of −52° C. before expansion in the valve 50) makes it possible to minimize this rise and thus to obtain the coldest possible reflux, this with the aim of limiting the losses of $CO_2$ at the column top.

For both examples, the ratio between the flows of the first and second fractions can be varied according to the carbon dioxide purity of the flow to be separated. Thus, the purer the flow 1 is in carbon dioxide, the smaller will be the first fraction 7 and the larger will be the second fraction 9.

In both examples, the process is kept cold by the expansion of the feed flow, no expansion turbine being necessary.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms “a”, “an” and “the” include plural referents, unless the context clearly dictates otherwise.

“Comprising” in a claim is an open transitional term which means the subsequently identified claim elements are a nonexclusive listing (i.e., anything else may be additionally included and remain within the scope of “comprising”).

"Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for the separation of a feed flow containing at least 95 mol % of carbon dioxide and also at least one impurity lighter than carbon dioxide by distillation, the process comprising the steps of:

- i. cooling the feed flow in a heat exchange means down to a first intermediate temperature of the heat exchange means, greater than that of a cold end and lower than that of a hot end of the heat exchange means, to form a liquid flow cooled to the first intermediate temperature and at a first pressure;
- ii. dividing the cooled liquid flow into at least two streams, thereby forming a first liquid fraction and a second liquid fraction;
- iii. expanding the first fraction in liquid form to a pressure of a distillation column, called second pressure, which is lower than the first pressure, and then sending the expanded first fraction to an intermediate level of the distillation column;
- iv. subcooling the second fraction in the heat exchange means down to the cold end, and then expanding the subcooled second fraction, in liquid form, to the pressure of the distillation column and then sending the expanded second fraction to a level of the distillation column above the point of arrival of the first fraction; and
- v. withdrawing a liquid flow containing at least 99 mol % of carbon dioxide from a bottom portion of the distillation column as a liquid product.

2. The process as claimed in claim 1, wherein at least a part of the overhead gas from the distillation column is withdrawn from the distillation column and heated in the heat exchange means.

3. The process as claimed in claim 1, wherein the feed flow is divided in order to form the first and second fractions outside the heat exchange means and the second fraction is expanded in a valve to a third intermediate pressure between the first pressure and that of the distillation column before being sent back to the heat exchange means in order to cool it.

4. The process as claimed in claim 3, wherein the second fraction is returned to the heat exchange means at a second temperature greater than the first temperature.

5. The process as claimed in claim 1, wherein at least a part of the bottom liquid from the distillation column is heated in the heat exchange means against the feed flow to be separated and is returned in gaseous form to the bottom portion of the distillation column.

6. The process as claimed in claim 5, wherein the part of the bottom liquid is sent to the heat exchange means at a third temperature greater than the first intermediate temperature, and optionally than the second temperature.

7. The process as claimed in claim 1, wherein the distillation column comprises two sections, a first section between the arrivals of the first and second fractions and a second section below the arrival of the first fraction, the first section having a diameter less than or equal to that of the second section.

8. The process as claimed in claim 1, wherein the ratio between the flows of the first and second fractions can be varied according to the carbon dioxide purity of the feed flow to be separated.

9. The process as claimed in claim 1, wherein the first pressure is greater than that of the distillation column by at least 1 bar.

* * * * *